United States Patent [19]

Liu

[11] Patent Number: 5,161,027
[45] Date of Patent: Nov. 3, 1992

[54] LARGE AREA PROJECTION LIQUID-CRYSTAL VIDEO DISPLAY SYSTEM WITH INHERENT GRID PATTERN OPTICALLY REMOVED

[75] Inventor: Hua-Kuang Liu, South Pasadena, Calif.

[73] Assignee: The United States of America as represented by the Administrator, National Aeronautics and Space Administration, Washington, D.C.

[21] Appl. No.: 632,408

[22] Filed: Dec. 21, 1990

Related U.S. Application Data

[63] Continuation of Ser. No. 913,433, Sep. 30, 1986, abandoned.

[51] Int. Cl.$^5$ .......................... H04N 5/74; H04N 9/31
[52] U.S. Cl. ........................ 358/231; 358/61; 358/232
[58] Field of Search ............... 358/231, 230, 232, 236, 358/241, 56, 59, 60, 63

[56] References Cited

U.S. PATENT DOCUMENTS

| | | | |
|---|---|---|---|
| 3,666,881 | 5/1972 | Stein | 358/230 |
| 3,723,651 | 3/1973 | Gorog | 358/236 |
| 3,764,211 | 10/1973 | Morse et al. | 355/71 |
| 3,895,866 | 11/1973 | de Quervain | 353/30 |
| 4,202,010 | 5/1980 | Hareng | 358/56 |
| 4,299,447 | 11/1981 | Soltan et al. | 350/334 |
| 4,389,096 | 6/1983 | Hori | 358/231 |
| 4,403,216 | 9/1983 | Yokoi | 358/236 |
| 4,435,732 | 3/1984 | Hyatt | 358/254 |
| 4,461,541 | 7/1984 | Duthie | 358/88 |
| 4,533,215 | 8/1985 | Trias et al. | 350/347 E |
| 4,769,712 | 9/1988 | Polaert | 358/231 |

FOREIGN PATENT DOCUMENTS

3291  1/1985  Japan .................................. 358/231

OTHER PUBLICATIONS

Electronic Display, copyrighted 1979, Utley Interscience.
Facsimile Printer Utilizing Liquid Crystal Cells, J. Rults, The 1970 IDEA Symposium, Society For Information Display, May 1970, pp. 106-107.
Liquid Crystal Matrix Display, by Bernard J. Lechner et al., Proceedings of the IEEE, vol. 59, No. 11, Nov. 1971, pp. 1566-1578.
Projection Television, by Angus Robertson, Wireless World, Sep. 1976, pp. 47-52.

Primary Examiner—Tommy P. Chin
Attorney, Agent, or Firm—John H. Kusmiss; Thomas H. Jones; Guy M. Miller

[57] ABSTRACT

A relatively small and low-cost system is provided for projecting a large and bright television image onto a screen. A minature liquid crystal array is driven by video circuitry to produce a pattern of transparencies in the array corresponding to a television image. Light is directed against the rear surface of the array to illuminate it, while a projection lens lies in front of the array to project the image of the array onto a large screen. Grid lines in the liquid crystal array are eliminated by a spacial filter which comprises a negative of the Fourier transform of the grid.

4 Claims, 1 Drawing Sheet 5,161,027

LARGE AREA PROJECTION LIQUID-CRYSTAL VIDEO DISPLAY SYSTEM WITH INHERENT GRID PATTERN OPTICALLY REMOVED

This application is a continuation of application Ser. No. 06/913,433, filed Sep. 30, 1986 now abandoned.

ORIGIN OF THE INVENTION

The invention described herein was made in the performance of work under a NASA contract, and is subject to the provisions of Public Law 96-517 (35 USC 202) in which the Contractor has elected not to retain title.

BACKGROUND OF THE INVENTION

In video or television projection, a television image is projected on a large screen, to enable a large number of people to view the image without the necessity for building a large cathode ray tube. Presently available projection television systems are expensive. A projection system for displaying television or computer-generated images, which could be constructed at low cost, using available off-the-shelf parts or using available technology with only slight modification, would be of considerable value.

SUMMARY OF THE INVENTION

In accordance with one embodiment of the invention, a low-cost system is provided for projecting television images onto a screen. The system includes a liquid crystal array containing a multiplicity of pixels that can each be energized to control its transparency. The array is energized by a video signal generating circuit, to energize the pixels in patterns of transparencies representing images. A light source directs light against the rearward side of the liquid crystal array, while a projection lens lying on the forward side of the array focuses an image of the array onto the screen.

A miniature liquid crystal array of a miniature television set, can be used, with the television video signal generating circuit of the miniature television set used to drive the array. It is possible to place the liquid crystal array in a slide or transparency projector, to project a television image onto a screen.

The largely opaque grid lines of a liquid crystal array can be eliminated by use of a spatial filter. The spatial filter is a negative of a Fourier transform of the grid lines. The projection lens forms an image of the array at an intermediate image location lying between the projection lens and the screen, and the spatial filter is located at that intermediate location.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
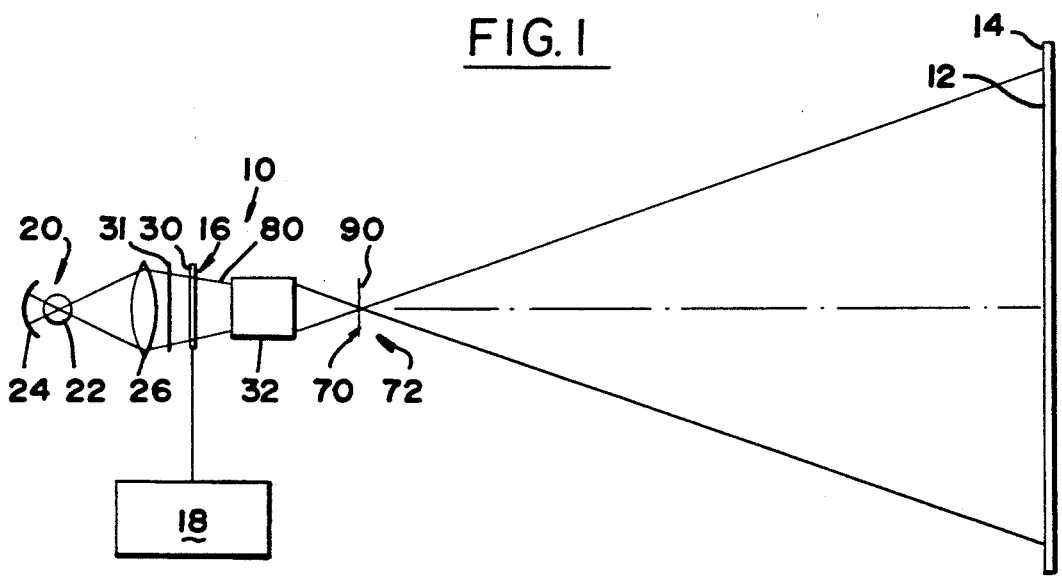
FIG. 1 is a simplified side elevation view of a television image projecting system constructed in accordance with the present invention.

FIG. 1 illustrates a system 10 for projecting a large television image 12 onto a large screen 14. The system includes a liquid crystal array 16 which is driven by a video drive circuit 18 to produce transparent areas on the array 16 that correspond to a television image. A light source 20, which includes a lamp 22, reflector 24, and concentrating lens 26, directs light against a rearward side 30 of the array, to substantially uniformly illuminate the array. An infrared filter 31 helps protect the array from excessive heating. A projection lens 32, which is located forward of the array, focuses an image of the array 16 onto the screen 14.

The array 16 and video circuit 18 are parts of a commercially available miniature or "pocket TV" television set. One example is the Radio Shack LCTV Realistic Pocketvision which has a 5.4 cm × 4.4 cm screen containing 146 rows and 120 columns of liquid crystal pixels, each being a square which is 370 um on each side. This miniature television set also includes circuitry including a receiver for receiving broadcast television signals and a video drive circuit for driving the array. The set, as originally manufactured, is intended for use by a person directly viewing the array while ambient light illuminates the rear of the array. Applicant uses this small array to create a large video image suitable for viewing by many people, by projecting very bright light through the array and forming a large projected image of the array onto a screen.

Figure 2:
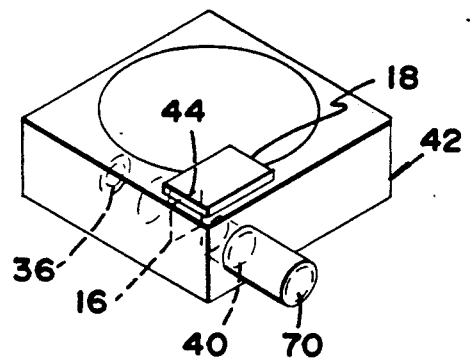
FIG. 2 is a perspective view of a slide projector, modified to project a television image.

FIG. 2 illustrates a projection system which uses the light source 36 and projection lens 40 of a Carousel or other type slide projector 42 to project an image of the liquid crystal array 16 onto a screen. Where the array 16 is of about the same size as that of a slide which can be projected, the array is placed at a projection location or film gate 44 of the slide projector, where slides are normally placed. Apparatus at the location 44 may have to be altered to accept a particular liquid crystal array that may be thicker and have a greater width or height than a slide which includes a cardboard holder and a positive photograph. The video circuitry 18 lies outside the slide projector but is connected to the array by a flexible ribbon-type cable. In this way, an available slide projector can be used, with small modifications, to project a large and bright television image onto a screen. Applicant has used an overhead slide projector, sometimes referred to as an overhead projector, of the type which has a horizontal surface on which slides or transparencies are laid, to project a large and bright television image onto the screen where the images of transparencies are otherwise projected.

Those pixels of the above TV set which are energized to become relatively opaque, have been found to transmit a small but appreciable amount of light, so the brightness of light should be limited to avoid "wash out." Contrast ratios of 10:1 to 20:1 are achieved with brightness levels about equal to that achieved using CRT projection systems that project onto a rear projection screen.

Figure 3:
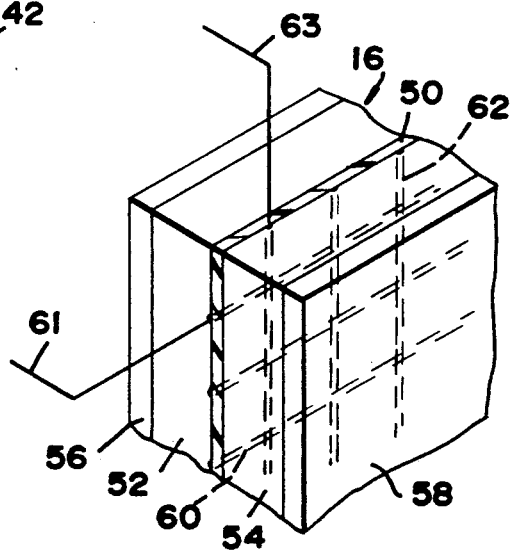
FIG. 3 is an enlarged sectional view of a portion of he liquid crystal array of the system of FIG. 1, this view being of a portion of the system which is known in the prior art.
Figure 4:
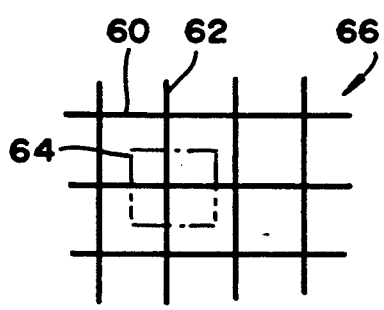
FIG. 4 is a partial elevation view of the array of FIG. 3.

The images projected in a manner described above have not been satisfactory, because they have suffered from the presence of a dark grid which is superimposed on the projected image. FIG. 3 illustrates some details of one liquid crystal array, which includes such a grid. The array includes a layer 50 of liquid crystal material sandwiched between a pair of glass plates 52, 54 which are, in turn, sandwiched between a pair of polarizer sheets 56, 58. The glass plates bear conductors 60, 62 that extend in perpendicular directions. When no voltage is applied between wires 61, 63 connected to the conductors, the pixel is energized at zero voltage, and the area of the array at the crossing becomes transparent. The crossing of a pair of conductors 60, 62 forms a pixel such as indicated at 64 in FIG. 4. While all of the layers are largely transparent (in that about one-half of incident light passes through for a black and white TV), the conductors 60, 62 are substantially opaque. These opaque grid lines, which are about 1/1,000th inch wide in the above TV set, become noticeable when a large bright image of the array is projected onto a screen.

Figure 5:
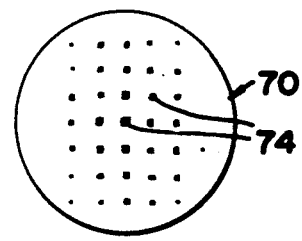
FIG. 5 is a simplified front elevation view of the spatial filter of FIG. 1.

Applicant eliminates the grid pattern by using a spatial filter such as shown at 70 in FIG. 1. The spatial filter 70 forms a pattern of light and dark areas substantially representing the Fourier transform of the grid pattern 66 of the array. The filter 70 is placed at an intermediate image location 72 where the projection lens forms a Fourier transform of the array, the intermediate image location 72 being located between the projection lens and the screen. If the light passing through the array is collimated, the location 72 is a distance from lens 32 equal to its focal length. FIG. 5 indicates the overall view of the spatial filter 70, showing that it contains numerous opaque areas 74 representing the negative of substantially a Fourier transform of the grid. The filter 70 can be constructed using the system of FIG. 1 by placing an unexposed film 90, which may include a plastic or glass plate with a photosensitive emulsion thereon, at the location 72 (but with no filter 70 thereat). The array is operated so all pixels are transparent (as by not applying any image in formation, and light from the source 20 is allowed to expose the film. If the emulsion on the film 90 is a negative type so that after developing it, bright spots appear dark and vice versa, then the developed film 90 (and copies of it) can be used as a spatial filter. If the emulsion on film 90 is a positive, then a negative of it is used. It may be noted that if the light 80 which passes through the array 16 is collimated, then the spatial filter 70 will be a Fourier transform of the grid.

The pixels of the liquid crystal array 16 are addressable to control the transparency of individual pixels or lines of pixels. While the means for generating video signals representing images that energize the pixels, can include a television broadcast receiver or video camera, it is also possible to use a computer to generate images that are locally produced (not broadcast) and that do not represent only an actual scene. While applicant has projected monochrome or black-and-white images, color images can be displayed by the use of a color-transmitting liquid crystal array where each pixel may transmit only one color (e.g., blue, red, or green) and the array is illuminated with white light.

Thus, the system provides an economical system for producing a large bright projection television image onto a screen, and a low-cost method for producing a large bright image from a small LCD (liquid crystal display) television. The rear of the liquid crystal array is illuminated by a bright light, and a projection lens in front of the array focuses an image of the array onto a screen. The area of the image on the screen is preferably at least one order of magnitude larger than that of the display, and preferably two orders magnitude (100 times as great). Where the array has a grid of substantially opaque lines, these are eliminated by using a spatial filter representing a negative of largely the Fourier transform of the grid.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A system for projecting video images on a screen, comprising:
    a liquid crystal array containing a multiplicity of pixels arranged in a multiplicity of rows and columns, and including a multiplicity of largely opaque row and column conductors extending along said rows and columns and forming a grid, each pixel being energizable to control its transparency, said array having rearward and forward sides;
    means for generating video signals representing said video images, said generating means connected to said array to energize said pixels in patterns of opacities and transparencies representing said video images;
    a light source which directs light against said rearward side of said array to pass in a forward direction to said screen through transparent pixels thereof;
    a projecting lens lying forward of said array, said lens constructed to focus said video images of said patterns of opacities and transparencies onto said screen, and to focus an image of light passing through said array at an intermediate plane between said lens and said screen; and
    a spatial filter lying at said intermediate plane, said spatial filter forming a pattern of light and dark areas representing largely a Fourier transform of said grid in said liquid crystal array.

2. The system described in claim 1 wherein said spatial filter comprises a plurality of opaque dots arranged in rows and columns.

3. A method for projecting television scenes onto a screen comprising:
    passing light through a liquid crystal array to said screen, said liquid crystal array having a multiplicity of pixels that are each energizable to control its transparency by selective energization of a control grid comprised of a multiplicity of largely opaque conductors lying in said array and forming an opaque grid pattern in said light passed through said liquid crystal onto said screen;
    energizing said array with video signals representing said television scenes to produce patterns of opaque and transparent pixels representing said television scenes;
    forming a projected image of light passing through said array on said screen using a projecting lens at an intermediate location between said array and said screen, and
    placing a spatial filter forming a pattern of light and dark areas representing largely a Fourier transform of said opaque grid pattern at said intermediate location.

4. The method described in claim 1 wherein said step of placing said spatial filter includes forming said spatial filter so it represents light and dark areas that are a negative of said video image at said intermediate location when said pixels are transparent.

* * * * *